April 26, 1949.  C. J. SCRANTON ET AL  2,468,641
ROTARY BALER
Filed March 3, 1944
3 Sheets-Sheet 1

Fig.1

Inventors
C. J. Scranton
P. H. Harret
by K. A. Wyman
Attorney

Patented Apr. 26, 1949

2,468,641

UNITED STATES PATENT OFFICE 2,468,641

ROTARY BALER

Charles J. Scranton and Paul H. Harrer, La Porte, Ind., assignors to Allis-Chalmers Manufacturing Company, Milwaukee, Wis., a corporation of Delaware Application March 3, 1944, Serial No. 524,888

23 Claims. (Cl. 100—1)

This invention relates to baling machines of the type embodying means for rolling material delivered thereto into a formed cylindrical bale of predetermined diameter and more particularly to the mechanism for wrapping binding material (hereinafter called twine) around the formed cylindrical bale while it is in the machine as shown and described but not claimed in P. H. Harrer's copending application Serial No. 524,190, filed February 28, 1944, which has issued as Patent No. 2,424,821, dated July 29, 1947.

The primary object of this invention is to provide an improved twine wrapping mechanism which is positive in operation and affords the optimum in simplicity and ease of adjustment, which is extremely durable, trouble free and easy to manufacture, and which operates to move the twine feeding member in an arcual path lengthwise of the bale with a substantially uniform horizontal velocity component.

Another object of this invention is to provide such a mechanism with an improved correlation of features which is effective, once the wrapping of the bale is initiated, to complete the bale wrapping operation, independently of the extent, if any, to which the twine is tensioned during the wrapping operation.

In accordance with this invention, one or more of the previously stated objects may be accomplished in whole or in part by providing a baling machine of the type herein specified with a simplified gear and cam drive-mechanism which is set in operation by the pull exerted on the twine in passing into the machine and which then operates to positively and sequentially perform all phases of the wrapping cycle, including the discharge of the bale when completely wrapped, independently of the extent, if any, to which the binding material is tensioned during the wrapping operation thus insuring a quick, uniform and trouble-free wrapping precedure.

The significance of the aforementioned objects and the manner in which they may be readily accomplished will become more apparent as the disclosure progresses and particularly points out additional objects, advantages and features of construction which are considered of special importance and of general application although shown and described as applied to a baling machine of the type disclosed in U. F. Luebben, Rotary Baler patents, U. S. 2,096,990 and 2,336,491, issued October 26, 1937, and December 14, 1943.

Accordingly, the invention may be considered as consisting of the various details of construction, correlations of features and arrangements of parts as is more fully set forth in the appended claims and in the attached description, reference being had to the accompanying drawings, in which:

Figure 1:
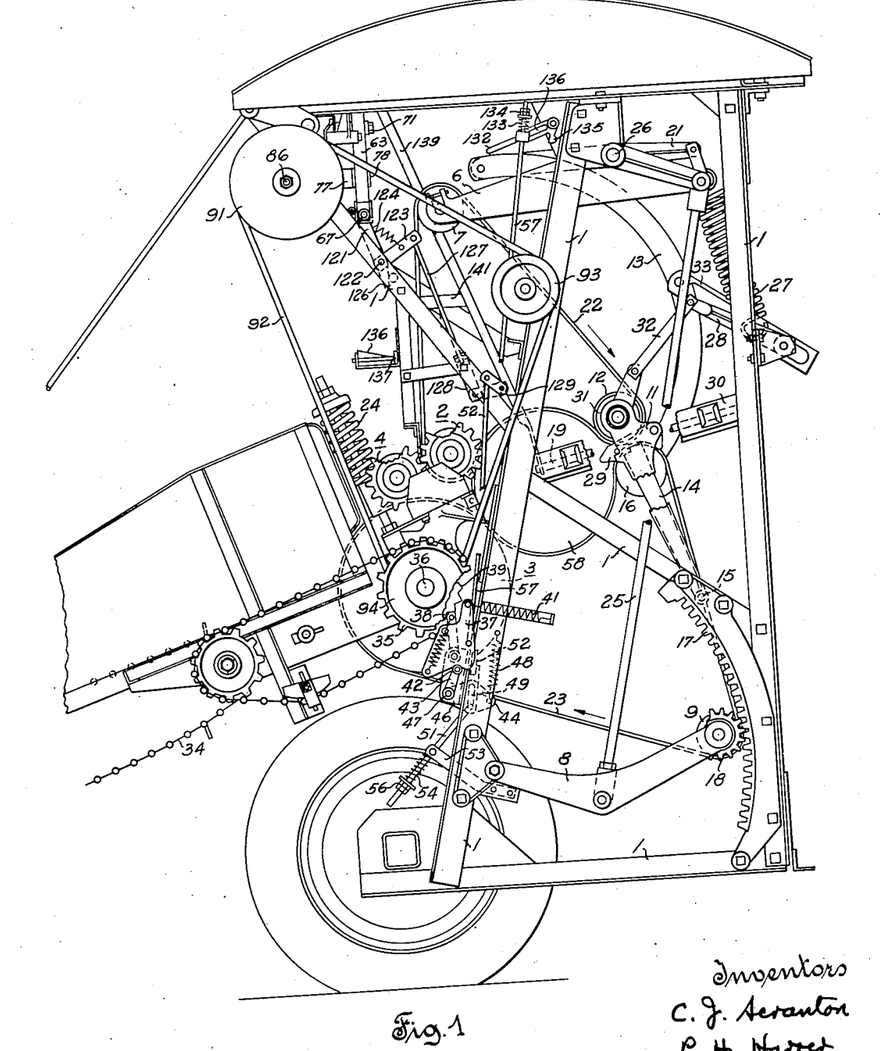
Fig. 1 is a partial side elevation of a rotary baler embodying the invention.

Referring to Fig. 1, it is seen that the invention may be applied to a wheel supported baling machine comprising a frame structure 1 operatively mounting an upper drive roll assembly 2, a lower drive roll assembly 3, a press roll assembly 4, an upper tension roll assembly including a pivotally supported tension arm 6 rotatably mounting a roll 7, a lower tension roll assembly including a pivotally supported tension arm 8 rotatably mounting a roll 9, an upper trip roll assembly including an arm 11 rotatably supporting a roll 12, a lower trip roll assembly including a hanger or bow member 13 supporting at its lower end an arm 14 which in turn rotatably mounts a roll 16, an arcuate rack 17 with which is engaged a pinion 18 carried by the adjacent end of lower tension arm 8, a pivoted latch release bar 19, and a discharge rocker arm 21.

One or more endless bale forming bands 22 are mounted for movement over the roll portion of drive assembly 2, over the roll 7 of the upper tension assembly, and over the roll 12 of the upper trip assembly. Also, one or more endless bale forming bands 23 are mounted for movement over the roll portion of drive assembly 3, over the roll 9 of the lower tension assembly, and over the roll 16 of the lower trip assembly; the bands being driven in opposite directions by the roll portions of the drive assemblies 2 and 3, respectively. Press roll assembly 4 is preferably gear driven by the upper drive roll assembly as shown and the roll portion of assembly 4 is preferably releasably held in engagement with the roll portion of lower drive assembly 3 by means of one or more springs 24.

The upper and lower tension arms 6 and 8 are pivotally interconnected for simultaneous angular movement by means of a rod 25 and the upper tension arm 6 and discharge rocker arm 21 are mounted for relative angular movement about a common fulcrum 26, arm 6 being biased by a spring (not shown) for clockwise movement about said fulcrum and arm 21 being biased against movement in a counterclockwise direction by means of a spring 27 having one end connected with one arm of a bell crank lever 28 and having its other end connected with the adjacent end of arm 21. Trip roll arms 11 and 14 are pivotally interconnected at 15 for relative angular movement and are normally retained locked in the alined position shown by means of a releasable latch 29 carried by arm 11 in a position to engage the top portion of the arm 14. Arm 11 also has mounted thereon a flanged wheel 31 adapted to engage and roll along the top surface of an inclined frame member 30 which mounts the latch bar 19; said arm and wheel being normally supported for coaction with said member by means of a link 32 connecting the upper end of arm 11 with an arm of bell crank lever 28. Movement of bow member 13 toward the lower drive roll assembly is limited by a looped link 33 connected as shown.

Material to be baled is delivered to a point adjacent the roll portions of press roll assembly 4 and lower drive roll assembly 3 by means of an endless conveyor 34 which is chain driven by a sprocket 35 operatively mounted on a normally rotating shaft 36 forming a part of the lower drive roll assembly 3; the relation between sprocket 35 and shaft 36 being such that when the pivotally mounted latch plate 37 is positioned with the pawl 38 thereon engaged with ratchet-like surface 39, the sprocket 35 drives conveyor 34 and that when latch plate 37 is moved to a pawl disengaging position by the action of spring 41, the sprocket 35 is stationary. Latch plate 37 is normally retained positioned to engage pawl 38 with ratchet-like surface 39 by means of a roller 42 carried by a crank arm 43; arm 43 and a plate 44 being integrally connected and pivotally mounted on a frame bracket 46 for angular movement about a common pivot 47. A spring 48 acts to retain arm 43 and plate 44 in the positions shown and the plate is provided with an elongated opening 49 therethrough in which is positioned the upper end of a downwardly extending link 51. An upwardly extending link 52 has its lower end pivotally connected with the adjacent end of link 51 for movement therewith. The lower end of link 51 is interconnected with a projection 53 on the adjacent end of lower tension arm 8 by means of an interposed spring 54, and spring positioning adjusting nuts 56. The position of spring 54 determines the extent lower tension arm 8 must move in a counterclockwise direction from its initial starting position in order to actuate crank arm 43 and effect the release of latch plate 37 which can be readily returned to its shown position with pawl 38 engaging ratchet-like surface 39 by means of a link 57 having its lower end connected with said plate.

The correlation of the various parts thus far described is functionally the same as the corresponding parts of the previously identified Lueben patents and although the conveyor drive is materially different from that disclosed by Lueben, the results accomplished are generally the same and a further description in this connection is deemed unnecessary for a complete understanding of the present invention; it being sufficient in this connection to point out that the material passing between the roll portions of the press roll assembly 4 and the lower drive roll assembly 3 is engaged by the endless bale forming bands 22 and 23 and rolled into a compact cylindrical bale 58 and that when the bale attains a desired diameter the conveyor is stopped and the latch release bar 19 actuated to lift latch 29 on arm 11 whereupon the upper and lower trip roll assemblies move apart ejecting the bale rearward from between the bale forming bands 22 and 23 and out of the machine; the trip and tension assemblies automatically returning to their initial bale starting positions with the arms 11 and 14 relatched in the alined relation shown.

Referring also to Figs. 2–7 inclusive, it is seen that the frame structure 1 also has mounted thereon apparatus for wrapping twine about the formed cylindrical bale, while it is in the machine, comprising a pair of spring pressed twine tensioning disks 59 and a twine roller 61 both mounted on one arm of a bell crank lever 62 in such relation that the roller 61 forces the twine between the disks 59, a twine feeding member or tube 63 having on its upper end a twine guide roller 64 for conducting the twine into the tube, having an intermediate external cam edge portion 66, and having at its lower end a twine feeding ferrule 67 through which the twine passes in leaving the tube, and a housing formed by spaced, rigidly connected and supported front and rear plates 68 and 69, respectively, operatively supporting the twine feed tube and mechanism for controllably positioning and positively moving the twine feed tube lengthwise of the bale with a substantially uniform horizontal velocity component during the bale wrapping operation.

Figure 2:
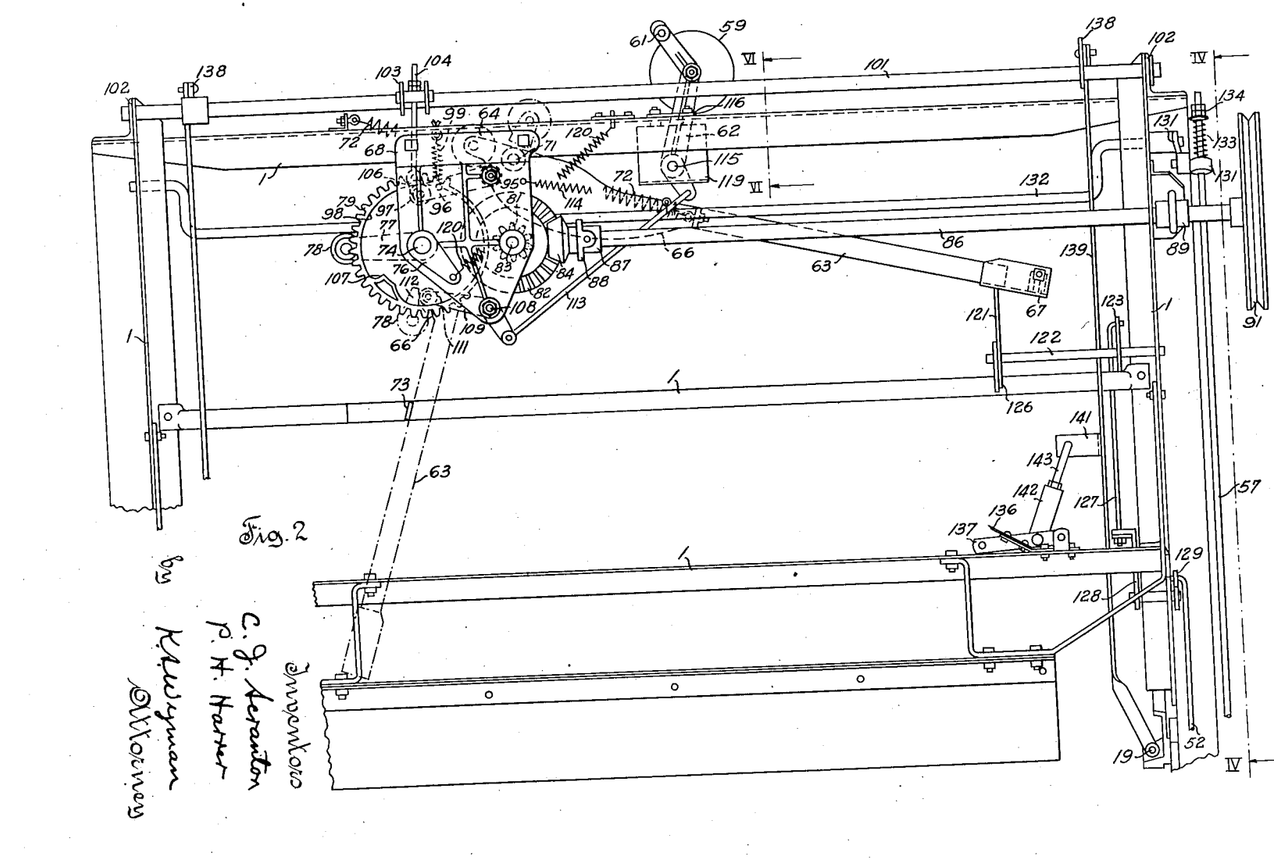
Fig. 2 is a partial front elevation of that portion of Fig. 1 embodying twine wrapping and bale discharge control mechanism.

The twine tube is supported for angular movement by having its upper end pivotally mounted on a fixed pin 71 projecting laterally outward from rear plate 69 and is biased by gravity and by the action of spring 72 to assume the dotted line position shown in Fig. 2; movement in the clockwise direction being limited by engagement with a fixed stop member 73 carried by a part of the frame structure 1. Plates 68 and 69 are provided with a pair of alined journals in which is rotatably mounted a shaft 74 having exposed front and rear end portions to which are secured crank arms 76 and 77, respectively, crank arm 77 having mounted thereon a laterally projecting roller 78 adapted to engage the cam portion 66 of twine tube 63. A spur gear 79 having a nontoothed peripheral portion (hereinafter called a partial gear) is fixed on shaft 74 between the plates 68 and 69 in such a position as to be driven through a predetermined angle by a spur gear 81 integral with the hub portion of a bevel gear 82 rotatably mounted between plates 68 and 69 on a fixed shaft 83 which extends between and is supported by said plates. Bevel gear 82 meshes with and is driven by a pinion 84 fixed on a shaft 86 which has its adjacent, inner end rotatably mounted in a bearing 87 supported by an integral forwardly projecting arm 88 on rear plate 69. The opposite end of shaft 86 is rotatably supported in a bearing 89 mounted on the frame structure 1 and carries at its outer end a V-belt pulley 91 which, as shown in Fig. 1, is driven by a belt 92 running over an idler pulley 93 mounted on the frame structure and over a drive pulley 94 fixed on shaft 36 of the lower drive roll assembly.

Front plate 68 has fixed thereon a rearwardly projecting fixed pin 95 on which is pivotally mounted a crank arm 96 carrying a laterally projecting roller 97 adapted to engage and ride on the inner peripheral surface 98 of the toothed flange portion of gear 79 as is best shown in Fig. 2; arm 96 being biased to maintain roller 97 in continuous engagement with surface 98 by means of a spring 99. A transverse shaft 101 is rotatably mounted in bearings 102 carried by opposite side portions of the frame structure 1 and is provided with a laterally projecting arm 103 which is connected with roller carrying crank arm 96 by means of links 104 and 106. Surface 98 is provided with an integral cam portion 107 and the movement of roller 97 thereover results in a counterclockwise movement of crank arm 96 as viewed in Fig. 2 and a corresponding movement of shaft 101 as viewed in Fig. 4.

Figures 3, 4, 5, 6, 7:
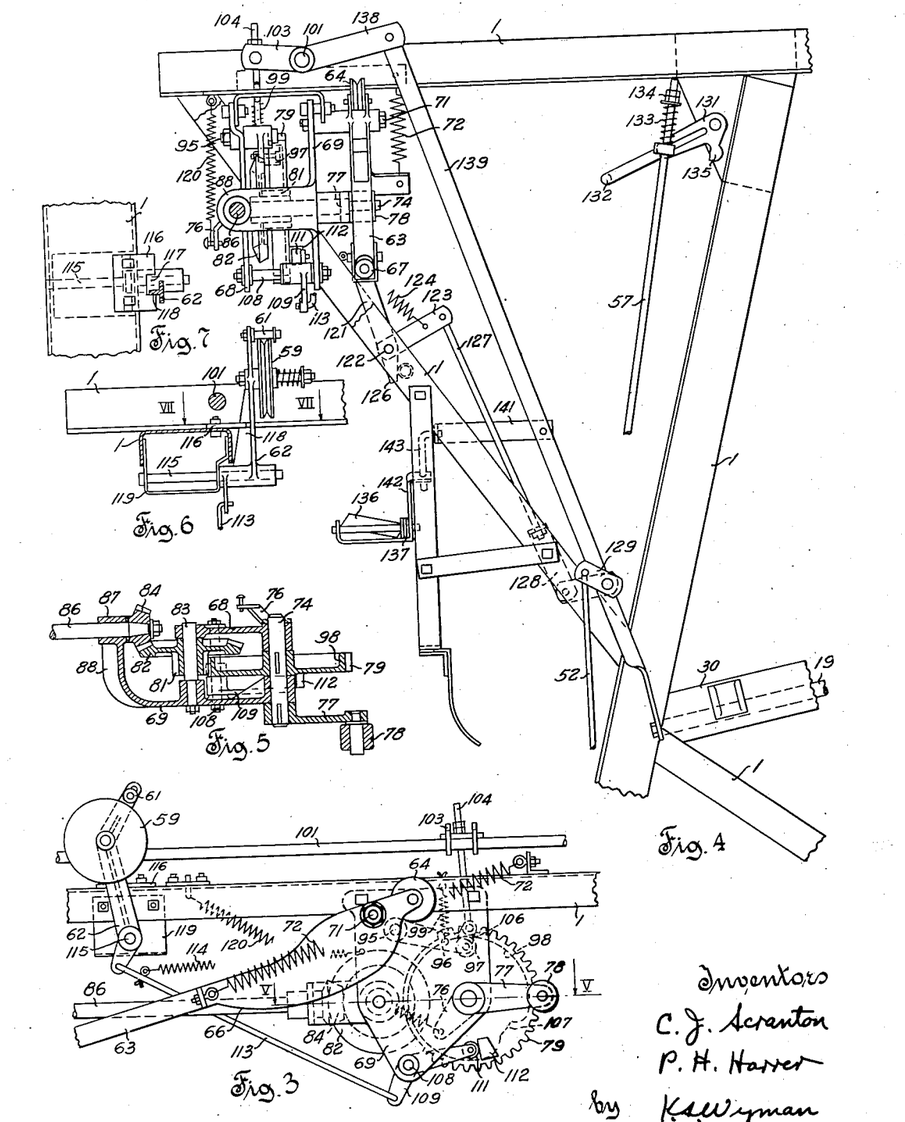
Fig. 3 is a partial rear elevation of the twine wrapping mechanism shown in Fig. 2.
Fig. 4 is a section taken on line IV—IV of Fig. 2 with the tension disk carrying bell crank and its support removed to better show the construction.
Fig. 5 is a section taken on line V—V of Fig. 3.
Fig. 6 is a partial section taken on line VI—VI of Fig. 2.
Fig. 7 is a partial section taken on line VII—VII of Fig. 6.

Plates 68 and 69 also have secured therebetween a fixed shaft 108 on which is pivotally mounted a bell crank lever 109 having on one arm thereof a roller 111 adapted to engage a stop projection 112 integral with the rear side of gear 79 as is best shown in Fig. 3 and having its other arm connected for simultaneous movement with the downwardly extending arm of the twine tensioning disk carrying bell crank 62 by means of a link 113; the bell cranks 62 and 109 both being normally retained in the positions shown by means of a spring 114 and a stop plate 116 (see Figs. 6 and 7) having an edge recess 117 into which projects a strengthening rib 118 integral with the front face of the disk carrying arm of bell crank 62. In this connection, bell crank 62 is pivotally mounted on the rearwardly projecting portion of a fixed rod or shaft 115 carried by a rigid U-shaped bracket 119 secured to the underside of an inverted U-shaped frame member (see Fig. 6) and the stop plate 116 is supported on and projects rearwardly beyond the edge of said frame member. Movement of the bell cranks 62 and 109 in a clockwise direction from the positions shown in Fig. 3 is obviously limited by the opposite edge of recess 117 in plate 116. Twine from a suitable source passes between roller 61 and disks 59, over guide roller 64, through the tube 63 and out the ferruled lower end thereof as best indicated in Fig. 2.

The crank arm 76 fixed on shaft 74 and thereby the crank arm 77, the roller 78 and the gear 79 are normally retained in the relative positions shown by means of a spring 120 having one end fastened to a fixed part of the structure and having its other end fastened to the outer end portion of crank arm 76; the arrangement of parts being such that spring 120 acts to rotate shaft 74, partial gear 79 and crank arms 76 and 77 in a counterclockwise direction as viewed in Fig. 2; that such movement is prevented by the engagement of roller 111 on bell crank lever 109 with the stop projection 112 on partial gear 79, that the toothed portion of partial gear 79 is in angularly spaced, out of mesh relation with respect to the teeth on drive gear 81 and therefore gear 81 is inoperative to drive partial gear 79 counterclockwise unless gear 79 is first rotated counterclockwise a sufficient distance to engage the first tooth thereon with the gear 81, and that the twine tube 63 is retained in its raised position by means of a latch 121 fixed on a rod 122 pivotally mounted on the frame structure 1 and biased to the position shown by means of an arm 123 fixed on rod 122 and a spring 124 connecting arm 123 with a fixed part of the structure; movement of the latch in the counterclockwise direction as viewed in Figs. 1 and 4 being limited by a stop projection 126 as shown.

Referring again to Fig. 1, it is seen that arm 123 on rod 122 is interconnected with link 52 by means of links 127, 128 and a bell crank lever 129 having one arm connected with the lower end of link 128 and having its other arm connected with the upper end of link 52. Conveyor drive latch plate link 57 has its upper end connected with an arm 131 fixed on the adjacent end of a pivotally mounted, transversely extending crank bar or rod 132 by means of an interposed spring 133 and spring positioning adjusting nuts 134. Movement of crank rod 132 in a counterclockwise direction and thereby the movement of link 57 and latch plate 37 in a pawl disengaging direction is limited by the engagement of a stop projection 135 on arm 131 with the adjacent frame structure. Crank rod 132 is positioned to be engaged by the upper end of bow member 13 as the lower trip roll assembly is returned toward and nears its initial bale starting position and the position of spring 133 determines the extent the rod 132 must be moved clockwise from the position shown in order to actuate link 57 and reposition latch plate 37 and pawl 38 as indicated in Fig. 1. In this connection, the spring position is preferably so adjusted that latch plate 37 and pawl 38 are repositioned to start conveyor 34 just as soon as the trip roll assemblies return to their initial bale starting positions.

Referring once again to Figs. 1, 2 and 4, it is seen that the frame structure also mounts a fixed twine cutting knife 136 positioned to be engaged by the twine fed from the ferruled end of tube 63 as it approaches its full line position and a pivotally mounted knife guard 137 normally positioned as shown in Fig. 2 to prevent the twine from contacting the knife and that shaft 101 is also provided with a pair of arms 138 one of which is shown as operatively connected with the adjacent end of latch release bar 19 by means of a link 139 and that link 139 is provided with a part 141 which is operatively connected with an arm 142 on twine guard 137 by means of a link 143. The arrangement is such that a counterclockwise movement of shaft 101 as viewed in Fig. 4 swings guard 137 upward and away from knife 136 and actuates latch bar 19 to release latch 29 which normally retains the trip roll assembly arms 11 and 14 locked in alinement.

Assuming that the machine is normally operating with the various parts positioned as shown, that is with the conveyor 34 delivering material to the machine and the material passing between the roll portions of the press and drive roll assemblies and then around the partially formed bale 58 disposed therein, it should be obvious that the upper and lower tension rolls 7 and 9, respectively, are moving toward each other, that the upper and lower tension arms 6 and 8, respectively, are both moving in a counterclockwise direction about their points of pivotal support, that the upper and lower trip roll assemblies are moving rearward with the flanged wheel 31 in engagement with frame member 30 and that the parts will continue to move as just described until the downward movement of projection 53 on lower tension arm 8 and of link 51 turns crank arm 43 and plate 44 a sufficient distance in a clockwise direction to first release twine tube 63 latch 121 thereby permitting twine tube 63 to swing downward to the dotted line position shown in Fig. 2 and to then release latch plate 37 which is immediately moved to its pawl disengaging position by the action of spring 41.

The dropping of twine tube 63 places the twine hanging from the ferruled end thereof on the material about to pass between the roll portions of the press and drive roll assemblies and the material carries the twine between said roll portions and around the formed bale. The conveyor 34 is still operating when the twine tube is dropped and continues to operate until the latch plate 37 is released as just described whereupon operation of the conveyor immediately ceases. The pull exerted on the twine in passing between the roll portions of the press and drive roll assemblies moves the twine tension disk carrying bell crank 62 and the link connected bell crank 109 in a counterclockwise direction as viewed in Fig. 2; such movement being limited by stop plate 116 (see Figs. 6 and 7) as previously described. The counterclockwise movement of bell crank 109 withdraws roller 111 from engagement with stop projection 112 on gear 79 and the spring 120 connected with arm 76 on shaft 79 quickly rotates shaft 74 and thereby arm 77 and gear 79 until the first tooth on gear 79 engages the continuously rotating spur gear 81. When in this position, the roller 78 on arm 77 is positioned in proximate spaced relation to the cam surface 66 on twine tube 63 (see Fig. 2) and the rotation of gear 81 drives gear 79 and thereby shaft 74 and arms 76 and 77 counterclockwise with uniform angular velocity until the various parts again reach the full line position shown in Fig. 2.

During the initial rotation of gear 79 by gear 81, twine tube 63 remains stationary in its dotted line position until roller 78 on arm 77 engages cam surface 66 and this delayed action permits one or more turns of twine to be wrapped around the adjacent end of the formed cylindrical bale before the twine tube commences to move lengthwise thereof. The engagement of roller 78 with cam surface 66 moves tube 63 in a counterclockwise direction toward its full line position; the cam surface 66 being so shaped that the end of the tube travels lengthwise of the bale with a substantially uniform horizontal velocity component as the tube moves from its dotted line position to its full line position and that when the tube reaches its full line position, it is held in such position until the latch 121 is repositioned to hold the tube in its raised position as shown.

In general, the correlation of parts is such that the tube 63 reaches its raised position just before the cam portion 107 on the inner peripheral surface 98 of gear 79 engages roller 97 on crank arm 96 and moves said arm downward in a counterclockwise direction as viewed in Fig. 2 and that the tube 63 is held in its raised position by the roller 78 on crank arm 77 until the cam portion 107 moves away from the roller 97 on arm 96. The counterclockwise movement of arm 96 is transmitted through links 104, 106 to shaft 101 which turns in a counterclockwise direction as viewed in Fig. 4 and through the medium of arm 138 and link 139 moves the guard 137 away from knife 136 and actuates bar 19 to release latch 29 carried by arm 11 of the upper trip roll assembly whereupon the twine snaps against and is cut by knife 136, the arms and rolls 11, 14 and 12, 16, respectively, of the trip roll assemblies move apart and discharge the bale from the machine, and the tension rolls 7 and 9 carried by arms 6 and 8, respectively, move away from each other to their initial bale starting positions; such movements of the tension and trip roll assemblies occurring substantially simultaneously.

The cutting of the twine releases the pull on twine tension disk bell crank 62 which is immediately returned to its normal position shown in Fig. 2 by spring 114 thereby repositioning roller 111 on bell crank 109 to be engaged by the stop projection 112 on gear 79. The return of lower tension arm 8 to its initial starting position releases the pull on link 51 and as a result links 51, 52, 127 and 128 are immediately moved upward by the action of spring 124. During this phase of the cycle latch plate 37 is held by spring 41 in the position determined by the engagement of stop projection 135 on arm 131 with the adjacent frame structure (note the upper end of link 57). This movement of links 51, 52, 127 and 128, which is sufficient to reposition latch 121 beneath twine tube 63 as shown in Figs. 1, 2 and 4, takes place during the time interval the tube is held in its fully raised position by roller 78 on arm 77, that is, during the time cam portion 107 on gear 79 is in engagement with the roller 97 on arm 96. In this connection, it should be noted that the twine tube is held substantially stationary for a short time interval before shaft 101 is actuated by crank arm 96 to effect the removal of twine guard 137 and the release of latch 29 which permits one or more turns of twine to be wrapped around this end of the bale before the twine is cut and the bale discharged from the machine. Shortly after the cam portion 107 is disengaged from roller 97 on arm 96, the gear 79 moves out of mesh with drive gear 81 at which time arm 76 moves over center with respect to spring 119 whereupon spring 119 rapidly rotates gear 79 and the parts movable therewith into the positions shown in Figs. 2 and 3.

Upon discharge of the bale from the machine, the upper and lower trip roll assemblies immediately return to their initial bale starting positions with the arms 11 and 14 locked in alinement by means of latch 29 on arm 11 and this rapid movement of the trip roll assemblies actuates crank rod 132 and thereby link 57 which repositions latch plate 37 and pawl 38 to start the conveyor and again deliver material to the press and drive roll assemblies just as soon as the various bale forming parts, that is the upper and lower tension and trip roll assemblies, are repositioned to receive the material. Consequently, the formation of another bale is positively started without any unnecessary delay and in this connection it should now be obvious that the twine wrapping mechanism operates to positively and sequentially perform all phases of the wrapping cycle, including the discharge of the bale when completely wrapped, thus insuring a quick, uniform and trouble free wrapping procedure. In addition, it should also be obvious that once the wrapping mechanism is set in operation, all phases of the wrapping cycle are positively performed in accurately timed sequence irrespective of the degree of twine tension, that during the wrapping operation, the end of the twine tube is positively moved lengthwise of the bale with a substantially uniform horizontal velocity component thus insuring a uniform spiral wrapping of the bale, and that the bale discharge mechanism is positively automatically operated and the bale discharged from the machine immediately after completion of the wrapping cycle and irrespective of twine tension thus insuring that the machine will be cleared of the bale and another bale immediately formed and wrapped even though the discharged bale was improperly wrapped due to twine breakage.

The invention is applicable in its broadest aspects to all types of rotary baling machines and it should therefore be understood that it is not intended to limit the invention to the exact construction and mode of operation herein shown and described for purposes of illustration as various modifications within the scope of the appended claims may occur to persons skilled in the art.

It is claimed and desired to secure by Letters Patent:

1. In a machine embodying means operative to roll material delivered thereto into a formed cylindrical bale of predetermined diameter and a twine feeding member mounted for movement in an arcual path longitudinally of the bale to effect a spiral wrapping of same, mechanism for effecting a bale wrapping movement of the twine feeding member comprising a driven means operative to move said member along said arcual path with a substantially uniform horizontal velocity component.

2. In a machine embodying means operative to roll material delivered thereto into a formed cylindrical bale of predetermined diameter, mechanism for spirally wrapping twine about a predetermined length of the formed bale comprising a twine feeding member mounted for movement in an arcual path longitudinally of the bale, a driving element, and means for establishing a driving connection between said element and member operative to move said member along said arcual path with a substantially uniform horizontal velocity component.

3. In a machine embodying means operative to roll material delivered thereto into a formed cylindrical bale of predetermined diameter, a twine feeding member mounted for movement longitudinally of the bale to effect a spiral wrapping of same, and means for imparting a predetermined degree of tension to the twine being fed from said member, means for moving said member longitudinally of the bale comprising a driving element, and mechanism including a part responsive to the pull exerted on the twine in passing into the machine for establishing a driving connection between said element and member, said mechanism being operative to maintain said established driving connection independently of substantial reduction in twine tension until a movable part of the mechanism is positively driven a predetermined distance.

4. In a machine embodying means operative to roll material delivered thereto into a formed cylindrical bale of predetermined diameter, means for spirally wrapping twine about a predetermined length of the formed bale comprising a twine feeding member mounted for movement longitudinally of the bale, means for releasably retaining said member positioned adjacent one end of the bale, means operative to release and position said member adjacent the other end of the bale with the end of the twine so disposed as to enter the machine with the material being delivered thereto, means for imparting a predetermined degree of tension to the twine being fed from said member, a driving element, and means responsive to the pull exerted on the twine in passing into the machine for establishing a driving connection between said element and member, said last mentioned means being operative to maintain said driving connection irrespective of variations in twine tension while a movable part thereof is positively driven a predetermined distance.

5. In a machine embodying means operative to roll material delivered thereto into a formed cylindrical bale of predetermined diameter, means for spirally wrapping twine about a predetermined length of the formed bale comprising a twine feeding member mounted for movement in an arcual path in traveling longitudinally of the bale, means for releasably retaining said member positioned adjacent one end of the bale, means operative to release and position said member adjacent the other end of the bale with the end of the twine so disposed as to enter the machine with the material being delivered thereto, means for imparting a predetermined degree of tension to the twine being fed from said member, a driving element, and means responsive to the pull exerted on the twine in passing into the machine for establishing a driving connection between said element and member operative to move said member along said arcual path with a substantially uniform horizontal velocity component, said last mentioned means being operative to maintain said driving connection irrespective of variations in twine tension while a movable part thereof is positively driven a predetermined distance.

6. In a machine embodying means operative to roll material delivered thereto into a formed cylindrical bale of predetermined diameter, means for spirally wrapping twine about a predetermined length of the formed bale comprising a twine feeding member mounted for movement in an arcual path in traveling longitudinally of the bale, means for releasably retaining said member positioned adjacent one end of the bale, means operative to release and position said mmber adjacent the other end of the bale with the end of the twine so disposed as to enter the machine with the material being delivered thereto, mechanism operative to engage and move said member along said arcual path with a substantially uniform horizontal velocity component, said mechanism including a driving element and a part adapted to be connected with and positively driven by said element through a predetermined angle each time a driving connection is established between said element and part, control means responsive to the pull exerted on the twine in passing into the machine for establishing said driving connection, and additional control means operative in response to a predetermined angular movement of said part for terminating said driving connection.

7. In a machine embodying means operative to roll material delivered thereto into a formed cylindrical bale of predetermined diameter, means for spirally wrapping twine about a predetermined length of the formed bale comprising a twine feeding member mounted for movement in an arcual path in traveling longitudinally of the bale, means for releasably retaining said member positioned adjacent one end of the bale, means operative to release and position said member adjacent the other end of the bale with the end of the twine so disposed as to enter the machine with the material being delivered thereto, a driven element, a cam mechanism operative to move said member along said arcual path with a substantially uniform horizontal velocity component, said mechanism including a movable part adapted to be connected with and driven by said element through a predetermined angle each time a driving connection is established between said element and part, control means operative in response to the pull exerted on the twine in passing into the machine for establishing a driving connection between said element and part, means operative to discharge the bale from the machine, and additional control means sequentially operative in response to a predetermined angular movement of said part for initiating operation of said bale discharging means and for terminating said driving connection.

8. In a machine embodying means operative to roll material delivered thereto into a formed cylindrical bale of predetermined diameter, means for spirally wrapping twine about a predetermined length of the formed bale comprising a twine feeding member mounted for movement in an arcual path in traveling longitudinally of the bale to be wrapped, means for releasably retaining said member positioned adjacent one end of said bale, means operative to release and position said member adjacent the other end of the formed bale with the end of the twine so disposed as to enter the machine with the material being delivered thereto, a normally rotating gear, means for moving said member along said arcual path with a substantially uniform horizontal velocity component including a cam carried by said member and a cam actuator adapted to be connected with and driven by said gear through a predetermined angle, control means operative in response to the pull exerted on the twine in passing into the machine for establishing a driving connection between said gear and actuator, means operative to discharge the formed bale from the machine, and means responsive to a predetermined angular movement of said actuator for sequentially severing the twine being fed from said member and initiating operation of said bale discharge means.

9. In a machine embodying means operative to roll material delivered thereto into a formed cylindrical bale of predetermined diameter, means for spirally wrapping twine about a predetermined length of the formed bale comprising a twine feeding member mounted for movement in an arcual path in traveling longitudinally of the bale to be wrapped, means for releasably retaining said member positioned adjacent one end of said bale, a first cam carried by said member, a normally rotating drive gear, a partial gear, means rotatably mounting and urging said partial gear into meshed driven relation with said drive gear, latch means operative to retain said partial gear in out-of-mesh relation with said drive gear, an element mounted for movement with said partial gear so as to assume a position in proximate spaced relation to said first cam as said partial gear is rotated to mesh with and be driven by said drive gear, means operative to release and position said member adjacent the other end of the formed bale with the end of the twine so disposed as to enter the machine with the material being delivered thereto, means operative in response to the pull exerted on the twine in passing into the machine for releasing said latch means whereby said partial gear rotates into mesh with and is driven by said drive gear and said element subsequently engages said first cam and thereby moves said member along said arcual path with a substantially uniform horizontal velocity component, a second cam movable with said partial gear, means operative to discharge the formed bale from the machine, and means responsive to the movement of said second cam for sequentially controlling severing of the twine fed from said member and initiation of the operation of said bale discharge means.

10. In a machine embodying means operative to roll material delivered thereto into a formed cylindrical bale of predetermined diameter, means for spirally wrapping twine about a predetermined length of the formed bale comprising a swingably mounted twine feeding member having an end normally retained in a raised position adjacent one end of the bale, a first cam carried by said member, a normally rotating drive gear, a partial gear, means rotatably mounting and urging said partial gear into meshed driven relation with said drive gear, latch means operative to retain said partial gear in out-of-mesh relation with said drive gear, an element mounted for movement with said partial gear and so as to assume a position in proximate spaced relation to said first cam as said partial gear is rotated to mesh with and be driven by said gear, means operative to release and position the end of said member adjacent the other end of the formed bale with the end of the twine so disposed as to enter the machine with the material being delivered thereto, means operative in response to the pull exerted on the twine in passing into the machine for releasing said latch means whereby said partial gear rotates into mesh with and is driven by said drive gear and said element subsequently engages said first cam and thereby moves the end of said member to its raised position with a substantially uniform horizontal velocity component, a second cam movable with said partial gear, means operative to discharge the formed bale from the machine, and means responsive to the movement of said second cam for sequentially controlling severing of the twine fed from said member and initiation of the operation of said bale discharge means.

11. In a machine embodying means operative to roll material delivered thereto into a formed cylindrical bale of predetermined diameter, means for spirally wrapping twine about a predetermined length of the formed bale comprising a twine feeding member having an end pivotally mounted adjacent one end of the bale to be wrapped and having its opposite end normally retained in a raised position adjacent the other end of the bale, a first cam carried by said member, a normally rotating drive gear, a partial gear, means rotatably mounting and urging said partial gear into meshed driven relation with said drive gear, latch means operative to retain said partial gear in out-of-mesh relation with said drive gear, an element mounted for movement with said partial gear and so as to assume a position in proximate spaced relation to said first cam as said partial gear is rotated to mesh with and be driven by said drive gear, means operative to release and position the opposite end of said member adjacent said one end of the formed bale with the end of the twine so disposed as to enter the machine with the material being delivered thereto, means operative in response to the pull exerted on the twine in passing into the machine for releasing said latch means whereby said partial gear meshes with and is driven by said drive gear and said element subsequently engages said first cam and thereby moves the opposite end of said member to its said raised position with a substantially uniform horizontal velocity component, a second cam movable with said partial gear, means operative to discharge the formed bale from the machine, and means responsive to the movement of said second cam for sequentially controlling severing of the twine fed from said member and initiation of the operation of said bale discharge means.

12. In a machine embodying means operative to roll material delivered thereto into a formed cylindrical bale of predetermined diameter, means for spirally wrapping twine about a predetermined length of the formed bale comprising a twine feeding member having an end pivotally mounted adjacent one end of the bale to be wrapped and having its opposite end normally retained in a raised position adjacent the other end of the bale, a first cam carried by said member, a normally rotating drive gear, a partial gear adapted to mesh with and be driven through a predetermined angle by said drive gear, means for rapidly rotating said partial gear from the position to which it is driven by said drive gear into a remeshing relation with same, a stop means positionable to terminate rotation of said partial gear with its teeth in out-of-mesh, angularly spaced relation with respect to the teeth on said drive gear, an element mounted for movement with said partial gear and so as to assume a position in proximate spaced relation to said first cam as said partial gear is released and moves into mesh with said drive gear, means operative to release and position the opposite end of said member adjacent said one end of the formed bale with the end of the twine so disposed as to enter the machine with the material being delivered thereto, means operative in response to the pull exerted on the twine in passing into the machine for removing said stop means whereupon said partial gear meshes with and is driven by said drive gear and said element subsequently engages said first cam and moves the opposite end of said member to its said raised position with a substantially uniform horizontal velocity component, a second cam movable with said partial gear, means operative to sever the twine and discharge the bale from the machine, and means responsive to the movement of said second cam for sequentially controlling the severing of the twine fed from said member and initiation of the operation of said bale discharge means.

13. In a machine embodying means operative to roll material delivered thereto into a formed cylindrical bale of predetermined diameter, means for spirally wrapping twine about a predetermined length of the formed bale comprising a twine feeding member having an end pivotally mounted adjacent one end of the bale to be wrapped and having its opposite end normally retained in a raised position adjacent the other end of the bale, a first cam carried by said member, a normally rotating drive gear, a partial gear adapted to mesh with and be driven through a predetermined angle by said drive gear, means for rapidly rotating said partial gear from the position to which it is driven by said drive gear into a remeshing relation with same, a stop means positionable to terminate rotation of said partial gear with its teeth in out-of-mesh, angularly spaced relation with respect to the teeth on said drive gear, an element mounted for movement with said partial gear and so as to assume a position in proximate spaced relation to said first cam as said partial gear is released and moves into mesh with said drive gear, means operative to release and position the opposite end of said member adjacent said one end of the formed bale with the end of the twine so disposed as to enter with the end of the twine so disposed as to enter the machine with the material being delivered thereto, means operative in response to the pull exerted on the twine in passing into the machine for removing said stop means whereupon said partial gear meshes with and is driven by said drive gear and said element subsequently engages said first cam and moves the opposite end of said member to its said raised position with a substantially uniform horizontal velocity component, said first cam being operative to retain said member in its fully raised position for a predetermined interval, means operative to sever the twine and discharge the bale from the machine, a second cam movable with said partial gear, and means actuated by the movement of said second cam during said interval for sequentially controlling the severing of the twine fed from said member and initiation of the operation of the bale discharge means.

14. In a machine embodying means operative to roll material delivered thereto into a formed cylindrical bale of predetermined diameter, means for spirally wrapping twine about a predetermined length of the formed bale comprising a twine feeding member mounted for movement in an arcual path in traveling longitudinally of the bale to be wrapped, means for releasably retaining said member positioned adjacent one end of said bale, means operative to release and position said member adjacent the other end of the formed bale with the end of the twine so disposed as to enter the machine with the material being delivered thereto, a normally rotating gear, means for moving said member along said arcual path with a substantially uniform horizontal velocity component including a cam carried by said member and a revolvable cam actuator drivenly connectable with said gear for movement through a partial revolution each time said driven connection is established, means operative to rapidly complete each partial revolution of the actuator effected by said gear, stop means positionable to terminate the rapid movement of said actuator and retain same in angularly spaced, non-driven relation with respect to said gear, control means operative in response to the pull exerted on the twine in passing into the machine for actuating said stop means to release said actuator whereupon said actuator rapidly moves into driven relation with said gear, means operative to sever the twine and discharge the bale from the machine, a second cam carried by said actuator, and means positioned to be engaged and actuated by said second cam for sequentially controlling the severing of the twine fed from said member and initiation of the operation of the bale discharge means.

15. In a machine embodying means operative to roll material delivered thereto into a formed cylindrical bale of predetermined diameter and a twine feeding member mounted for movement longitudinally of the bale to effect a wrapping of same, means operative to engage and move said member longitudinally of the bale comprising a driving element and a part drivenly connectable with said element and movable thereby a predetermined distance constituting one phase of a definite cycle of movement, means operative to rapidly move said part through the other phase of said cycle, stop means positionable to be engaged by and terminate movement of said part after it has commenced and completed only a portion of said other phase, and control means operative in response to the attainment of a predetermined condition for disengaging said stop means from said part and operative in response to said part having moved a predetermined portion of said distance for repositioning said stop means for subsequent engagement by said part.

16. In a machine embodying means operative to roll material delivered thereto into a formed cylindrical bale of predetermined diameter and a twine feeding member mounted for movement longitudinally of the bale to effect a wrapping of same, means operative to engage and move said member longitudinally of the bale comprising a part, means for repeatedly moving said part through a predetermined cycle of movement including a phase of rapid movement and a phase of relatively slow movement, stop means positionable to be engaged by and terminate movement of said part after initiation and before completion of said phase of rapid movement, means operative in response to the pull exerted on the twine in passing into the machine for disengaging said stop means from said part and operative in response to the completion of the bale wrapping operation for repositioning said stop means for subsequent engagement by said part.

17. In a machine embodying means operative to roll material delivered thereto into a formed cylindrical bale of predetermined diameter and a twine feeding member mounted for movement longitudinally of the bale to effect a wrapping of same, means operative to engage and move said member longitudinally of the bale comprising a part, means for repeatedly moving said part through a predetermined cycle of movement including a phase of rapid movement and a phase of relatively slow movement, stop means positionable to terminate movement of said part after initiation and before completion of said phase of rapid movement, and means for controlling the position of said stop means to terminate the movement of said part during the rapid movement phase of each cycle.

18. In a machine embodying means operative to roll material delivered thereto into a formed cylindrical bale of predetermined diameter, mechanism for spirally wrapping twine about a predetermined length of the bale comprising a twine feeding member mounted for movement in an arcual path in traveling longitudinally of the bale, a driving element, and means responsive to the pull exerted on the twine in passing into the machine for establishing a driving connection between said element and member operative to move said member along said arcual path with a substantially uniform horizontal velocity component.

19. In a machine embodying means operative to roll material delivered thereto into a formed cylindrical bale of predetermined diameter, means for spirally wrapping twine about a predetermined length of the bale comprising a twine feeding member mounted for movement longitudinally of the bale, a driving element, a rotatably mounted part adapted to be connected with and positively driven by said element through a predetermined angle each time a driving connection is established between said element and part, mechanism for transmitting motion from said part to said member, control means for establishing said driving connection, and additional control means operative in response to a predetermined angular movement of said part for terminating said driving connection.

20. In a machine embodying means operative to roll material delivered thereto into a formed cylindrical bale of predetermined diameter, means for spirally wrapping twine about a predetermined length of the bale comprising a twine feeding member mounted for movement longitudinally of the bale, a driving element, a rotatably mounted part adapted to be connected with and positively driven by said element through a predetermined angle each time a driving connection is established between said element and part, said member and part including a cam and a cam actuator operative to transmit motion from said part to said member, control means for establishing said driving connection, and additional control means responsive to a predetermined angular movement of said part for terminating said driving connection.

21. In a machine embodying means operative to roll material delivered thereto into a formed cylindrical bale of predetermined diameter, means for spirally wrapping twine about a predetermined length of the bale comprising a twine feeding member mounted for movement in an arcual path in traveling longitudinally of the bale, a driving element, a rotatably mounted part adapted to be connected with and positively driven by said element through a predetermined angle each time a driving connection is established between said element and part, and means operative to move said member along said arcual path with a substantially uniform horizontal velocity component each time a driving connection is established between said element and part.

22. In a machine embodying means operative to roll material delivered thereto into a formed cylindrical bale of predetermined diameter, mechanism for spirally wrapping twine about a predetermined length of the bale comprising a twine feeding member mounted for movement longitudinally of the bale, a twine tensioning device, a driving element, and means responsive to the pull exerted on the twine in passing into the machine for establishing a driving connection between said element and member operative independently of substantial reduction in twine tension, to move said member longitudinally of the bale for a predetermined distance each time a driving connection is established between said element and member.

23. In a machine embodying means operative to roll material delivered thereto into a formed cylindrical bale of predetermined diameter and a twine feeding member mounted for movement longitudinally of the bale to effect a wrapping of same, means operative to engage and move said member longitudinally of the bale comprising a movably mounted part, means operative to move said part a predetermined distance constituting one phase of a definite cycle of movement, additional means operative to move said part through the other phase of said cycle, a stop means positionable to arrest the movement of said part after it has commenced and completed only a portion of said other phase, and control means operative in response to the attainment of a predetermined condition for withdrawing said stop means from its part-arresting position, and operative in response to the resulting movement of said part for repositioning said stop means in its said part-arresting position.

CHARLES J. SCRANTON.
PAUL H. HARRER.

REFERENCES CITED

The following references are of record in the file of this patent:

UNITED STATES PATENTS

| Number | Name | Date |
|---|---|---|
| 2,336,491 | Luebben | Dec. 14, 1943 |